United States Patent
Park et al.

(10) Patent No.: US 9,805,361 B2
(45) Date of Patent: Oct. 31, 2017

(54) SECURITY IN MOBILE PAYMENT SERVICE

(71) Applicant: KT CORPORATION, Gyeonggi-do (KR)

(72) Inventors: Jong-Han Park, Seoul (KR); Dong-Wan Kim, Seoul (KR); Min-Gu Lee, Gyeonggi-do (KR); Ra-Woon Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 626 days.

(21) Appl. No.: 14/077,395

(22) Filed: Nov. 12, 2013

(65) Prior Publication Data

US 2014/0136355 A1 May 15, 2014

(30) Foreign Application Priority Data

Nov. 12, 2012 (KR) ........................ 10-2012-0127707

(51) Int. Cl.
*G06Q 40/00* (2012.01)
*G06G 1/12* (2006.01)
*G06Q 20/34* (2012.01)
*G06Q 20/32* (2012.01)
*G06Q 20/38* (2012.01)

(52) U.S. Cl.
CPC ......... *G06Q 20/351* (2013.01); *G06Q 20/322* (2013.01); *G06Q 20/385* (2013.01)

(58) Field of Classification Search
USPC .......................................................... 705/21
See application file for complete search history.

(56) References Cited

U.S. PATENT DOCUMENTS

| | | | | |
|---|---|---|---|---|
| 5,883,810 A | * | 3/1999 | Franklin | G06Q 20/02 235/379 |
| 6,000,832 A | * | 12/1999 | Franklin | G06Q 20/02 235/379 |
| 6,636,833 B1 | * | 10/2003 | Flitcroft | G06Q 20/00 235/380 |
| 7,107,242 B1 | * | 9/2006 | Vasil | G06Q 20/10 705/35 |
| 7,229,014 B1 | * | 6/2007 | Snyder | G06Q 20/16 235/380 |
| 7,287,692 B1 | * | 10/2007 | Patel | G06Q 20/10 235/379 |

(Continued)

FOREIGN PATENT DOCUMENTS

KR  10-2001-0112546 A  12/2001
KR  10-2005-0097624 A  10/2005

(Continued)

*Primary Examiner* — Ashford S Hayles
(74) *Attorney, Agent, or Firm* — IP Legal Services, LLC

(57) ABSTRACT

The disclosure is related to providing a mobile payment service without revealing an actual payment card number. User equipment may be configured to receive a set of virtual mobile payment card numbers assigned to a mobile payment card, to select one of the received virtual mobile payment card numbers based on a payment initiation time upon generation of a predetermined event, and to transmit a payment request with the selected virtual mobile payment card number and the payment initiation time to the server through at least one of a point-of-sale (POS) terminal and a value-added network (VAN) server.

10 Claims, 4 Drawing Sheets

(56) References Cited

U.S. PATENT DOCUMENTS

| | | | |
|---|---|---|---|
| 7,603,320 B1* | 10/2009 | Shu | G06Q 20/20 705/16 |
| 7,814,018 B1* | 10/2010 | Sosa | G06Q 20/1085 705/43 |
| 7,822,666 B1* | 10/2010 | Bursch | G06F 21/34 235/380 |
| 7,908,216 B1* | 3/2011 | Davis | G06Q 20/02 705/41 |
| 8,074,877 B2* | 12/2011 | Mullen | G06K 19/06206 235/375 |
| 8,151,345 B1* | 4/2012 | Yeager | G06Q 20/367 235/375 |
| 8,181,861 B2* | 5/2012 | Sandstrom | G06Q 20/10 235/380 |
| 8,566,168 B1* | 10/2013 | Bierbaum | G06Q 20/20 455/558 |
| 8,744,966 B1* | 6/2014 | Amacker | G06Q 20/363 705/35 |
| 8,925,804 B2* | 1/2015 | Grigg | G06Q 30/00 235/380 |
| 9,552,573 B2* | 1/2017 | Kulpati | G06Q 20/3223 |
| 2001/0034702 A1* | 10/2001 | Mockett | G06Q 20/02 705/39 |
| 2001/0034717 A1* | 10/2001 | Whitworth | G06Q 20/341 705/64 |
| 2001/0047330 A1* | 11/2001 | Gephart | G06Q 20/04 705/39 |
| 2001/0051924 A1* | 12/2001 | Uberti | G06Q 20/02 705/44 |
| 2003/0004879 A1* | 1/2003 | Demoff | G06Q 20/02 705/44 |
| 2003/0110136 A1* | 6/2003 | Wells | G06Q 20/04 705/64 |
| 2003/0195842 A1* | 10/2003 | Reece | G06Q 20/04 705/39 |
| 2004/0133507 A1* | 7/2004 | Barbour | G06Q 20/04 705/38 |
| 2004/0210449 A1* | 10/2004 | Breck | G06Q 10/04 705/39 |
| 2005/0154643 A1* | 7/2005 | Doan | G06Q 20/24 705/26.1 |
| 2005/0187882 A1* | 8/2005 | Sovio | G06Q 20/20 705/64 |
| 2006/0124756 A1* | 6/2006 | Brown | G06K 19/06206 235/492 |
| 2007/0083444 A1* | 4/2007 | Matthews | G06Q 10/04 705/30 |
| 2007/0114274 A1* | 5/2007 | Gibbs | G06Q 20/12 235/380 |
| 2007/0170245 A1* | 7/2007 | Elbaum | G06Q 20/04 235/380 |
| 2007/0194110 A1* | 8/2007 | Esplin | G06Q 20/20 235/383 |
| 2007/0208671 A1* | 9/2007 | Brown | G06Q 20/341 705/65 |
| 2007/0266131 A1* | 11/2007 | Mazur | G06Q 20/32 709/223 |
| 2008/0201265 A1* | 8/2008 | Hewton | G06Q 20/04 705/67 |
| 2008/0249910 A1* | 10/2008 | Hill | G06Q 20/04 705/35 |
| 2008/0319905 A1* | 12/2008 | Carlson | G06Q 20/04 705/44 |
| 2009/0048971 A1* | 2/2009 | Hathaway | G06Q 20/105 705/41 |
| 2009/0134217 A1* | 5/2009 | Flitcroft | G06Q 20/00 235/380 |
| 2010/0030688 A1* | 2/2010 | Patterson | G06Q 20/02 705/44 |
| 2010/0063906 A1* | 3/2010 | Nelsen | G06Q 20/28 705/30 |
| 2010/0078471 A1 | 4/2010 | Lin et al. | |
| 2010/0078472 A1 | 4/2010 | Lin et al. | |
| 2010/0082481 A1 | 4/2010 | Lin et al. | |
| 2010/0114731 A1* | 5/2010 | Kingston | G06Q 20/10 705/26.1 |
| 2010/0125508 A1* | 5/2010 | Smith | G06Q 20/10 705/16 |
| 2010/0125516 A1* | 5/2010 | Wankmueller | G06Q 20/20 705/35 |
| 2010/0138347 A1* | 6/2010 | Chen | G06Q 20/10 705/44 |
| 2010/0228668 A1* | 9/2010 | Hogan | G06Q 20/02 705/41 |
| 2010/0243730 A1* | 9/2010 | Safahi | G06Q 10/00 235/380 |
| 2010/0299267 A1* | 11/2010 | Faith | G06Q 20/10 705/76 |
| 2010/0312704 A1* | 12/2010 | Rohatgi | G06Q 20/40 705/44 |
| 2011/0078079 A1* | 3/2011 | Shin | G06Q 20/32 705/44 |
| 2011/0131102 A1* | 6/2011 | Wang | G06Q 20/10 705/16 |
| 2011/0153437 A1* | 6/2011 | Archer | G06Q 20/10 705/17 |
| 2011/0153496 A1* | 6/2011 | Royyuru | G06Q 20/12 705/44 |
| 2011/0166992 A1* | 7/2011 | Dessert | G06Q 20/0655 705/39 |
| 2011/0184867 A1* | 7/2011 | Varadarajan | G06Q 20/04 705/44 |
| 2011/0191149 A1* | 8/2011 | Blackhurst | G06Q 20/102 705/14.1 |
| 2011/0208659 A1* | 8/2011 | Easterly | G06Q 20/027 705/79 |
| 2012/0011063 A1* | 1/2012 | Killian | G06Q 20/105 705/41 |
| 2012/0024946 A1* | 2/2012 | Tullis | G06Q 20/385 235/379 |
| 2012/0116902 A1* | 5/2012 | Cardina | G06Q 20/10 705/17 |
| 2012/0123940 A1* | 5/2012 | Killian | G06Q 20/40 705/44 |
| 2012/0130797 A1 | 5/2012 | Shin | |
| 2012/0143759 A1* | 6/2012 | Ritorto, Jr. | G06Q 20/02 705/44 |
| 2012/0158593 A1* | 6/2012 | Garfinkle | G06Q 20/382 705/64 |
| 2012/0191611 A1* | 7/2012 | Kelly | G06Q 20/382 705/64 |
| 2012/0221420 A1* | 8/2012 | Ross | G06Q 40/00 705/16 |
| 2012/0226582 A1* | 9/2012 | Hammad | G06F 21/34 705/26.41 |
| 2012/0284194 A1* | 11/2012 | Liu | G06Q 30/06 705/66 |
| 2012/0310826 A1* | 12/2012 | Chatterjee | G06Q 20/36 705/41 |
| 2013/0018779 A1* | 1/2013 | Laquerre | G06Q 40/02 705/39 |
| 2013/0110719 A1* | 5/2013 | Carter | G06Q 20/204 705/44 |
| 2013/0124349 A1* | 5/2013 | Khan | G06Q 20/36 705/21 |
| 2013/0124412 A1* | 5/2013 | Itwaru | G06Q 20/322 705/44 |
| 2013/0166402 A1* | 6/2013 | Parento | G06Q 20/20 705/21 |
| 2013/0166441 A1* | 6/2013 | Kobylkin | G06Q 20/354 705/39 |
| 2013/0282588 A1* | 10/2013 | Hruska | G06Q 20/10 705/67 |
| 2013/0346305 A1* | 12/2013 | Mendes | G06Q 20/351 705/41 |
| 2014/0006224 A1* | 1/2014 | Grigg | G06Q 10/0837 705/28 |

(56) References Cited

U.S. PATENT DOCUMENTS

| | | | | |
|---|---|---|---|---|
| 2014/0006276 A1* | 1/2014 | Grigg | ............. | G06Q 20/322 |
| | | | | 705/41 |
| 2014/0067674 A1* | 3/2014 | Leyva | ............. | G06Q 20/20 |
| | | | | 705/44 |
| 2014/0122328 A1* | 5/2014 | Grigg | ............. | G06Q 20/322 |
| | | | | 705/40 |
| 2014/0129435 A1* | 5/2014 | Pardo | ............. | G06Q 20/36 |
| | | | | 705/41 |
| 2015/0134540 A1* | 5/2015 | Law | ............. | G06Q 20/351 |
| | | | | 705/72 |

FOREIGN PATENT DOCUMENTS

| | | |
|---|---|---|
| KR | 10-0871970 B1 | 12/2008 |
| KR | 10-2011-0009377 A | 1/2011 |
| KR | 10-2011-0056561 A | 5/2011 |
| WO | 01/95204 A1 | 12/2001 |
| WO | WO 0192989 A2 * 12/2001 ............. G06Q 20/04 |

* cited by examiner

SECURITY IN MOBILE PAYMENT SERVICE

CROSS REFERENCE TO PRIOR APPLICATIONS

The present application claims priority under 35 U.S.C. §119 to Korean Patent Application No. 10-2012-0127707 (filed on Nov. 12, 2012), which is hereby incorporated by reference in its entirety.

BACKGROUND

Lately, consumers are able to make payments through various types of payment means including payment cards. The payment card is a card that might be used by a consumer and accepted by a merchant to make a payment for purchasing a good or a service. The payment card includes a credit card, a debit card, an automated teller machine (ATM), a charge card, a stored-value card, a gift card, and so forth.

Due to advanced technologies of mobile devices, consumers frequently want to make payments using a mobile payment service. The mobile payment service is also referred to as mobile money or a mobile wallet. The mobile payment service is a payment service that enables a consumer to make payment via a mobile device based on a predetermined financial arrangement. Instead of making a payment with cash, a consumer can use a mobile device such as user equipment such as a smart phone to pay for a wide range of services and goods. The mobile payment service might be a different application for a form of a payment card. For example, a payment card might be issued through a mobile device and digitally installed in the mobile device. Furthermore, many payment card companies (e.g., credit card companies) provide a digital version of a payment card that can be digitally installed in a mobile device and used as a mobile payment.

Due to various convenient features thereof, the mobile payment service has been popular among consumers. In general, a mobile payment service is provided by transmitting information on a mobile payment card to third parties of a payment processing system, such as a point-of-sale (POS) terminal and a value added network (VAN) server. For example, user equipment provides payment card information including an actual card number of a mobile payment card to the POS terminal and the POS terminal transmits the received payment card information to the VAN server. That is, the payment card information including the mobile payment card number is revealed to the POS terminal and the VAN server. Such payment card information might be illegally captured by the third parties or from a data path to the third parties.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present embodiment, a mobile payment service is provided without revealing a mobile payment card number to third parties of a payment processing system.

In accordance with another aspect of the present embodiment, a payment made using a mobile payment card is processed based on one of virtual mobile payment card numbers assigned to the mobile payment card.

In accordance with still another aspect of the present embodiment, the virtual mobile payment card numbers change according to a payment initiation time.

In accordance with at least one embodiment, a method may be provided for providing a mobile payment service using a virtual mobile payment card number. The method includes receiving, from a server, a set of virtual mobile payment card numbers assigned to a mobile payment card issued to user equipment, selecting one of the received virtual mobile payment card numbers based on a payment initiation time upon generation of a predetermined event, and transmitting a payment request with the selected virtual mobile payment card number and the payment initiation time to the server through at least one of a point-of-sale (POS) terminal and a value-added network (VAN) server.

The method may further include storing the received virtual mobile payment card numbers each assigned with a predetermined valid time period in association with information on the issued mobile payment card in a format of a mapping table. The method may further include confirming a current date and time as the payment initiation time when a payment process is initiated, selecting a virtual mobile payment card number having a valid time period matched with the payment initiation time, and generating the payment request to include information on the selected virtual mobile payment card number with the payment initiation time.

Such transmitting may include transmitting the payment request with the selected virtual mobile payment card number and the payment initiation time to the POS terminal. The POS terminal transmits the received payment request with the selected virtual mobile payment card number and the payment initiation time to the VAN server and the VAN server transmits the received payment request with the selected virtual mobile payment card number and the payment initiation time to the server.

The receiving may include receiving a new set of virtual mobile payment card numbers at a regular interval from the server, updating a previous set of virtual mobile payment card numbers with the new set of virtual mobile payment card numbers, and storing the updated set of virtual mobile payment card numbers each assigned with a predetermined valid time period in association with information on the issued mobile payment card in a format of a mapping table.

The set of virtual mobile payment card numbers includes a predetermined number of virtual mobile card numbers. Each virtual mobile payment card number is assigned with a predetermined valid time period. Each virtual payment card number has a numeral format identical to the issued mobile payment card. Each virtual payment card number has an issuer identifier identical the issued mobile payment card. Each virtual payment card number has an account number different from an actual account number of the issued mobile payment card. Each virtual payment card number has a unique account number different from other virtual payment card numbers assigned to the same issued mobile payment card. Each virtual payment card number has a unique account number included in a predetermined virtual number range. Each virtual payment card number has a check digit indicating a virtual mobile payment card number. Each virtual mobile payment card number has a sequence of sixteen numeral digits. Each virtual mobile payment card number includes first six numeral digits indicating an issuer identifier and identical to the issued mobile payment card and next nine numeral digits indicating an account number, and included in a predetermined virtual payment card number range.

In accordance with at least one embodiment of the present disclosure, a method may be provided for providing a mobile payment service using virtual mobile payment card numbers. The method of a server includes generating a set of virtual mobile payment card numbers associated with a mobile payment card issued by the server or registered at the server through user equipment, storing the set of virtual mobile payment card numbers in association with information on the mobile payment card in a format of a mapping table, and providing the set of virtual mobile payment card numbers to the user equipment having the mobile payment card.

The generating includes generating a predetermined number of virtual mobile card numbers as the set of virtual mobile payment card numbers assigned to the issued mobile payment card, generating each virtual mobile payment card number assigned with a predetermined valid time period, generating each virtual payment card number to have a numeral format identical to the issued mobile payment card, generating each virtual payment card number to have an issuer identifier identical the issued mobile payment card, generating each virtual payment card number to have an account number different from an actual account number of the issued mobile payment card, and generating each virtual payment card number to have an unique account number different from other virtual payment card numbers assigned to the same issued mobile payment card.

The generating further includes generating each virtual payment card number to have a unique account number included in a predetermined virtual number range, and generating each virtual payment card number to have a check digit indicating a virtual mobile payment card number.

The generating includes generating each virtual mobile payment card number to have a sequence of sixteen numeral digits, generating each virtual mobile payment card number to include first six numeral digits indicating an issuer identifier and identical to the issued mobile payment card and generating each virtual mobile payment card number to include next nine numeral digits indicating an account number and included in a predetermined virtual payment card number range.

The method further includes generating a new set of virtual mobile payment card numbers at a predetermined regular interval, updating a previous set of virtual mobile payment card numbers with the new set of virtual mobile payment card numbers and storing the updated set of virtual mobile payment card numbers each assigned with a predetermined valid time period in association with information on the issued mobile payment card in a format of a mapping table, and providing the new set of virtual mobile payment card numbers to the user equipment including the issued mobile payment card.

The method further includes receiving a payment request from the user equipment having the issued mobile payment card through at least one of a point-of-sale (POS) terminal and a value added network (VAN) server, determining whether the received payment request is made using a virtual mobile payment card number or not, obtaining a virtual mobile payment card number from the received payment request when the received payment request is determined as being made using the virtual mobile payment card number, searching for an actual mobile payment card number of the issued mobile payment card based on the obtained virtual mobile payment card number, and performing a payment approval procedure with the actual mobile payment card number The determining includes obtaining an account number of a mobile payment card number included in the received payment request, determining whether the obtained account number is included in a predetermined virtual card number range, and confirming that the received payment request is made using the virtual mobile payment card number when the obtained account number is included in the predetermined virtual card number range. The method further includes transmitting a result of the payment approval procedure to the user equipment through at least one of the POS terminal and the VAN server.

In accordance with at least one embodiment of the present disclosure, user equipment is provided for providing a mobile payment service using a virtual mobile payment card number. The user equipment configured to receive, from a server, a set of virtual mobile payment card numbers assigned to a mobile payment card issued to user equipment, to select one of the received virtual mobile payment card numbers based on a payment initiation time upon generation of a predetermined event, and to transmit a payment request with the selected virtual mobile payment card number and the payment initiation time to the server through at least one of a point-of-sale (POS) terminal and a value-added network (VAN) server.

BRIEF DESCRIPTION OF THE DRAWINGS

The above and/or other aspects of the present invention will become apparent and more readily appreciated from the following description of embodiments, taken in conjunction with the accompanying drawings, of which.

DESCRIPTION OF EMBODIMENTS

Figure 1:
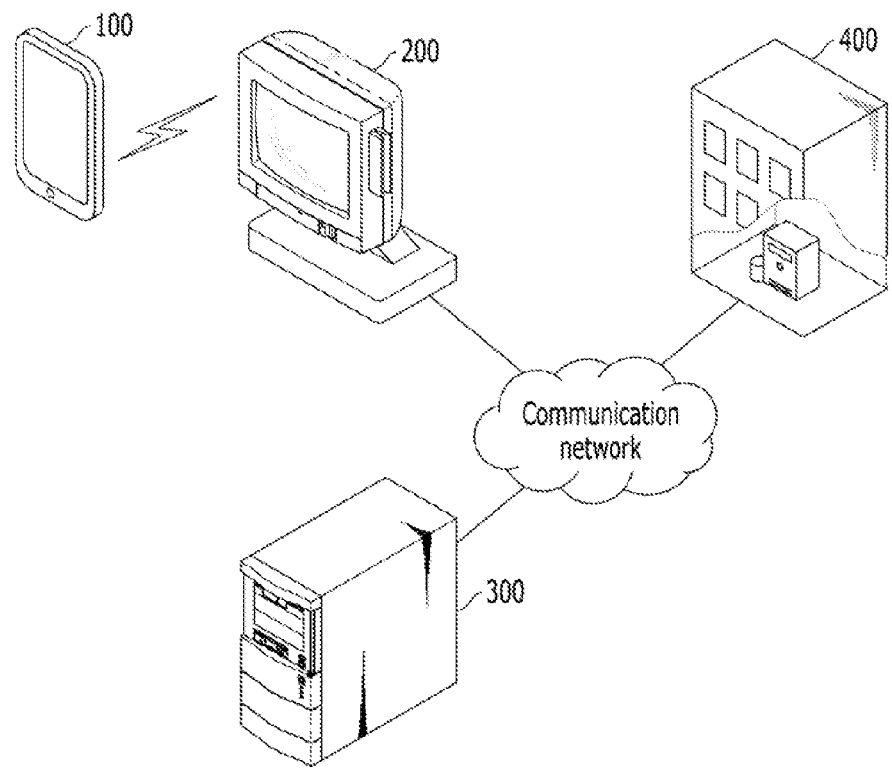
FIG. 1 illustrates a payment card processing system in accordance with at least one embodiment.

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with at least one embodiment, payment card information is prevented from being revealed to third parties in a payment processing system, such as a point-of-sale (POS) terminal and a value-added network (VAN) server, while making a payment using a payment card. In order to prevent the revealing of the payment card information to third parties, a payment made through a payment card is processed using one of virtual payment card numbers assigned to the payment card. Hereinafter, such a payment card processing system for preventing the revealing of payment card information to third parties in accordance with at least one embodiment will be described with reference to FIG. 1.

FIG. 1 illustrates a payment card processing system in accordance with at least one embodiment.

Referring to FIG. 1, a payment card processing system includes user equipment 100, POS terminal 200, VAN server 300, and payment service server 400. User equipment 100 may be coupled to POS terminal 200 through a wireless communication link and POS terminal 200, VAN server 300, and payment service server 400 may be coupled to each other through various types of communication networks.

User equipment 100 is an electronic device that provides a consumer with a mobile payment service. The mobile payment service enables a user to make a payment using a mobile payment card issued or digitally installed therein. Such a mobile payment service might be provided through an application installed in user equipment 100 in connection with payment service server 400. User equipment 100 may be any device used directly by an end-user to communicate and to perform operations associated with the mobile payment service. User equipment 100 may include a hand-held telephone, a mobile phone, a smart phone, a personal digital assistance (PDA), a pad-like device, a laptop computer equipped with a mobile broadband adapter, and so forth.

The payment card may be a card that can be used by a cardholder and accepted by a merchant to make a payment for a purchase or in payment of some other obligation. Such payment card includes a credit card, a debit card, an automated teller machine (ATM) card, a charge card, a stored-value card, a gift card, a membership card, and so forth. The mobile payment card may be a digital version of a typical payment card. The mobile payment card may be referred to as mobile money, mobile money transfer, and mobile wallet. With the mobile payment card, the mobile payment service may be provided.

The mobile payment service is a service for making a payment through a mobile payment card. The mobile payment service may be operated under financial agreement and regulation, and performed from or via user equipment 100. Instead of paying with cash, cheque, or credit cards, a consumer can use user equipment 100 installed with the mobile payment card to pay for a wide range of services and digital or hard goods. In order to provide a mobile payment service, i) a payment card may be issued through user equipment 100, as a mobile payment card, ii) a payment card may be registered at payment service server 400 through user equipment 100, or iii) a digital version of a payment card may be installed in user equipment 100 as a mobile payment card.

As described, a payment card, as a mobile payment card, may be issued through user equipment 100 from a related company such as a bank or a credit card company (e.g., payment service server 400). For example, a consumer applies a predetermined credit card through user equipment 100. Upon the approval of the application thereof, the consumer might be enable to download a digital version of the predetermined credit card in user equipment 100 and installs the downloaded digital version thereof for a mobile payment service of the predetermined credit card.

Furthermore, a user may register a payment card (e.g., a typical plastic payment card) at payment service server 400 through an associated application installed in user equipment 100. For example, user equipment 100 includes a dedicated application that enables a consumer to register a typical payment card for a mobile payment service at payment service server 400 or that enables a consumer to enter information on a typical payment card (e.g., plastic payment card). Upon the registration or upon the entering of the information thereof, user equipment 110 stores information on a payment card, as a mobile payment card, in a memory thereof.

In addition, a digital version of a payment card might be installed, as a mobile payment card, in user equipment 100 for a mobile payment service. For example, a related company of a payment card might provide a digital version (e.g., App) thereof to a consumer for a mobile payment service. In this case, a consumer might download such digital version of a payment means from a related server (e.g., payment service server 400) and digitally install the downloaded app in user equipment 100.

Like a typical payment card, a mobile payment card is assigned with a unique card number. For example, the unique card number is a sequence of sixteen digit numbers. The first six digits of the card number are referred to as an issuer identifier. For example, the first six digits indicate an issuer identifier and/or routing information. The next nine digits thereof are referred to as an account number and indicate an account number of the payment card. The last one digit is referred to as a check digit.

Typically, user equipment 100 provides payment card information including such a card number of a mobile payment card to payment service server 400 through POS terminal 200 and VAN server 300 when a consumer wants to make a payment using a mobile payment card of user equipment 100. That is, the payment card information including the mobile payment card number is transmitted to the third parties such as POS terminal 200 and VAN server 300 in order to process a payment made through the mobile payment card. Since the payment card information is revealed to third parties such as POS terminal 200 and VAN server 300, it might be easier to illegally capture the payment card information from a data path to POS terminal 200 or VAN server 300 and directly from POS terminal 200 or VAN server 300 as compared to capturing from a data path to payment service server 400 or directly from payment service server 400. Accordingly, the system should prevent such disclosure of payment card information to the third parties.

In order to prevent such disclosure of payment card information to third parties, user equipment 100 receives at least one of virtual payment card numbers generated by a service server of an associated payment card company (e.g., payment service server 400) associated with a mobile payment card of user equipment 100 in accordance with at least one embodiment. For example, user equipment 100 receives a predetermined number of virtual payment card numbers assigned to a mobile payment card of user equipment 100. Each virtual payment card number has the same numeral format as compared to an issued mobile payment card or a typical mobile payment card. Each virtual payment card number has the same issuer identifier as compared to the issued mobile payment card. Each virtual payment card number has an account number different from that of the issued mobile payment card and other virtual payment card numbers assigned to the issued mobile payment card. Each virtual payment card number has the last digit indicating a virtual mobile payment card number. Each virtual payment card number is mapped to a predetermined valid time period such as one hour, six hours, a day, a month, and so forth.

The number of virtual payment card numbers assigned to each mobile payment card, the valid time period assigned to each virtual payment card number, and a method of selecting one of virtual payment card numbers may be determined by a user or a service provider. For example, the number of virtual payment card numbers is twelve, twenty four, thirty, or three hundred sixty five, and the valid time period thereof is two hours, one hour, or a day, respectively. Such a set of virtual payment card numbers may be regularly updated, for example, every day, every month, or every year, depending on the valid time period.

For example, when user equipment 100 receives twenty four virtual payment card numbers associated with an issued mobile payment card and each assigned with a valid time period of one hour, such a set of virtual payment card numbers may be updated every day by payment service server 400. Furthermore, when a payment initiation time is 2:15 PM, user equipment 100 selects one assigned with a valid time period of 2 PM to make a payment.

User equipment 100 selects one of virtual payment card numbers based on a payment initiation time and uses the selected virtual payment card number to make a payment. That is, user equipment 100 i) determines a payment initiation time when a user thereof makes a payment using a mobile payment card of user equipment 100, ii) selects one of virtual payment card numbers based on the payment initiation time, and iii) transmits a payment request to POS terminal 200 with payment card information including the selected virtual payment card number and the payment initiation time. The payment initiation time may be a time that a consumer initiates a process of making a payment of a purchase using a mobile payment card in user equipment 100. That is, the payment initiation time may be a time that a consumer initiates an application for a mobile payment service or a time that user equipment 100 receives a predetermined signal from POS terminal 200, but the present invention is not limited thereto.

User equipment 100 transmits a payment request with payment card information including a selected virtual payment card number and a payment initiation time to payment service server 400 through POS terminal 200 and VAN server 300. As described, user equipment 100 does not reveal or disclose the actual mobile payment card number of the mobile payment card to POS terminal 200 and/or VAN server 300 in accordance with at least one embodiment of the present invention. Since the virtual mobile payment card number has the same numeral format of the issued mobile payment card, the virtual mobile payment card number is compatible with a typical payment processing system such as POS terminal 200 and VAN server 300.

As described above, user equipment 100 may be coupled to POS terminal 200 of a merchant through a wireless link upon the generation of a predetermined event, such as entering a predetermined radius from POS terminal 200, touching a predetermined sensor of POS terminal 200, scanning a predetermined code image displayed on user equipment 100. POS terminal 200 is a payment terminal of a merchant at point of sale where a customer makes a payment to the merchant in exchange for goods or services.

In accordance with at least one embodiment, POS terminal 200 receives a payment request with payment card information including a virtual payment card number and a payment initiation time from user equipment 100 instead of receiving the actual card number of the mobile payment card. That is, the actual card number of the mobile payment card is not revealed to POS terminal 200 in accordance with at least one embodiment. After the reception of the payment request, POS terminal 200 delivers the payment request with the payment card information including the virtual card number to VAN server 300.

POS terminal 200 also receives a payment approval message from payment service server 400 through VAN server 300 and completes a payment process based on the received payment approval message. After completion, POS terminal 200 transmits a payment process result message to user equipment 100.

VAN server 300 is a service server acting as an intermediary for providing a payment processing service between user equipment 100 and payment service server 400 through POS terminal 200. In general, i) VAN server 300 receives information on a payment card of a consumer from POS terminal 200 of a merchant through communication network. ii) VAN server 300 transmits a payment request with the received payment card information to payment service server 400 of a payment card company. iii) VAN server 300 may receive a payment approval message from payment service server 400 and iv) transmit the received request approval message to POS terminal 200.

In accordance with at least one embodiment, VAN server 300 receives the payment card information including a virtual payment card number and a payment initiation time from POS terminal 200 and transfers the received payment card information to payment service server 400. As described, the actual number of the mobile payment card installed in user equipment 100 is not revealed to VAN server 300 in accordance with at least one embodiment.

Payment service server 400 performs operations for providing a mobile payment service using a virtual mobile payment card number in accordance with at least one embodiment. Payment service server 400 may be a service server of a payment card company. Particularly, payment service server 400 may issue a mobile payment card to user equipment 100 in response to a request thereof. Payment service server 400 may provide a predetermined application associated with a mobile payment card for a mobile payment service. For example, payment service server 400 provides an application that enables a user of user equipment 100 to register typical payment cards at payment service server 400 as a mobile payment card or an application that enables a consumer to enter information thereon as a mobile payment card. Such an application may be a digital version of a payment card.

In accordance with at least one embodiment, payment service server 400 generates the predetermined number of virtual card numbers per a mobile payment card issued to user equipment 100. Particularly, one or more of the following i) through viii) occurs:

i) Payment service server 400 generates the predetermined number of virtual payment card numbers each assigned with a valid time period. The number and the valid time period may be determined by a user or a service provider. The number and the valid time period may be determined based on various factors. For example, the number of virtual mobile payment card numbers may be twenty four, thirty, and three hundred sixty five, and the valid time period may be one hour and one day.

ii) Payment service server 400 generates each virtual payment card number having the same format as compared to the issued mobile payment card and a typical payment card. For example, payment service server 400 generates a virtual payment card number having sixteen digits of numbers, which is the same numeral format of the typical payment card as well as the issued mobile payment card.

iii) Payment service server 400 generates each virtual payment card number having the same issuer identifier number (e.g., first six digits) as compared to the issued mobile payment card. As described, the first six digits of the payment card number are the issuer identifier. Since the virtual payment card number is processed through third parties, POS terminal 200 and VAN server 300, the virtual payment card number needs to have the same issuer identifier number.

iv) Payment service server 400 generates each virtual payment card number having an account number (e.g., next nine digits) different from an actual account number of the issued mobile payment card.

v) Payment service server 400 generates ach virtual payment card number having unique account number (e.g., next nine digits) different from other virtual payment card numbers assigned to the same issued mobile payment card.

vi) Payment service server 400 generates each virtual payment card number having unique account number included in a predetermined virtual number range. For example, the predetermined virtual number range may be 100000000 to 999999999, but the present invention is not limited thereto. Such a predetermined virtual number range may be decided differently by agreement between user and a service provider.

vii) Payment service server 400 generates each virtual payment card number having the last digit indicating a virtual mobile payment card number. For example, the last digit may be one of 1 to 9, but the present invention is not limited thereto. Such a last digit may be decided differently by agreement between a user and a service provider.

viii) Payment service server 400 regularly generates a new set of virtual mobile payment card numbers at a predetermined update cycle and updates and provides the new set of virtual mobile payment card numbers to user equipment 100. For example, such a predetermined update cycle may be determined based on the number of virtual mobile payment card numbers and an associated valid time period. When the number of virtual mobile payment card numbers assigned to one issued mobile payment card is twenty four and the associated valid time period is one day, payment service server 400 regenerates a new set of virtual mobile payment card number every day and provides the new set of virtual mobile payment card numbers to user equipment 100. The present invention, however, is not limited thereto. User equipment 100 may reuse the virtual mobile payment card numbers without requesting regeneration thereof.

The set of virtual mobile payment card numbers was described as being generated by payment service server 400 and provided to user equipment 200. The present invention, however, is not limited thereto. Such a set of virtual mobile payment card numbers may be generated based on the same algorithm by both of payment service server 400 and user equipment 200 at the same interval. For example, user equipment 200 and payment service server 400 share the same algorithm to generate virtual payment card numbers and generate a set of virtual payment card numbers using the same shared algorithm at the same interval.

After the generation of the set of virtual card numbers, payment service server 400 maps the set of virtual card numbers to information on a respective mobile payment card and stores the mapping information thereof. Based on such stored mapping information, payment service server 400 can trace back an actual mobile payment card number based on one of virtual mobile payment card numbers associated with the mobile payment card. After storing the mapping information and the generated virtual card numbers, payment service server 400 transmits the set of virtual card numbers to user equipment 100 having an associated issued mobile payment card.

Payment service server 400 receives a payment request from user equipment 100 through POS terminal 200 and VAN server 300. Payment service server 400 determines whether the payment request is made using a virtual mobile payment card number of not. For example, payment service server 400 may check whether an account number thereof is included in a predetermined virtual payment card range or not or check whether the last digit thereof indicates a virtual payment card or not. When the payment request is determined as being made using a virtual mobile payment card number, payment service server 400 searches for an actual mobile payment card number based on the virtual mobile payment card number and the payment initiation time based on a mapping table stored in a memory thereof. After obtaining the actual mobile payment card number, payment service server 400 performs a payment approval procedure and transmits a payment approval message based on the result thereof to user equipment 100 through POS terminal 200 and VAN server 300.

Figure 2:
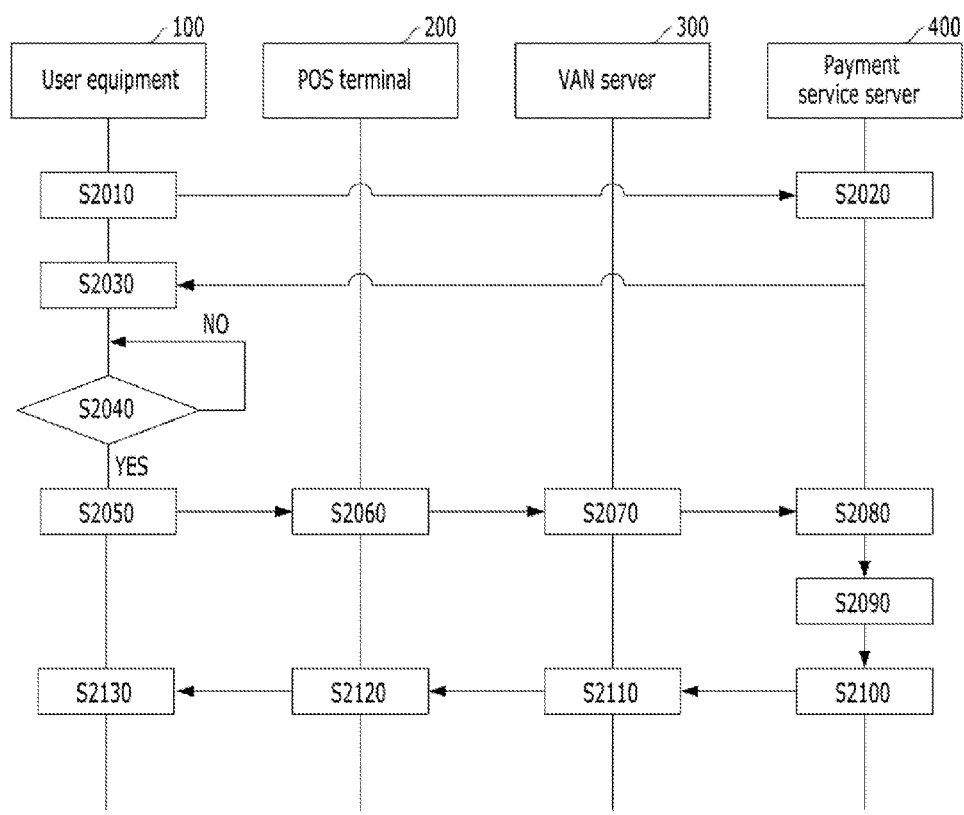
FIG. 2 illustrates a typical method of processing a payment made using a mobile payment card.

As described, a payment of a purchase is made using a mobile payment card without revealing an actual mobile payment card number to POS terminal 200 and VAN server 300 in accordance with at least one embodiment. Before describing such a payment processing method in accordance with at least one embodiment, a typical payment processing method will be described with reference to FIG. 2. FIG. 2 illustrates a typical method of processing a payment made using a mobile payment card.

Referring to FIG. 2, user equipment 100 requests payment service server 400 for a mobile payment card at step S2010. In response to the request, payment service server 400 issues a mobile payment card to user equipment 100 at step S2020. At step S2030, user equipment 100 digitally installs the issued mobile payment card therein. At step S2040, user equipment 100 determines whether a payment process is initiated or not. Such determination may be made based on a predetermined event generated in user equipment 100.

When user equipment 100 determines that the payment process is initiated (Yes—S2040), user equipment 100 transmits a payment request to POS terminal 200 at step S2050. For example, user equipment 100 transmits the payment request with payment card information including an actual mobile payment card number to POS terminal 200.

At step S2060, POS terminal 200 receives from user equipment 100 the payment request with the payment card information including the actual mobile payment card number and transmits the same to VAN server 300. At step S2070, VAN server 300 receives from POS terminal 200 the payment request with the payment card information including the actual mobile payment card number and transmits the same to payment service server 400.

At step S2080, payment service server 400 receives the payment request with the payment card information including the actual mobile payment card number. At step S2090, payment service server 400 performs a payment approval process with the actual mobile payment card number. At step S2100, payment service server 400 transmits a result of the payment approval process to VAN server 300.

At step S2110, VAN server 300 receives the payment approval result from payment service server 400 and transmits the same to POS terminal 200. At step S2120, POS terminal 200 receives the payment approval result from VAN server 300 and completes the payment process with the actual mobile payment card number based on the received payment approval result. Furthermore, POS terminal 200 transmits a result of the payment process to user equipment 100. At step S2130, user equipment 100 receives the result of the payment process from POS terminal 200 and displays the received result thereon.

As described, the actual mobile payment card number is disclosed to third parties of a payment processing system, such as POS terminal 200 and VAN server 300. Such payment card information (e.g., the actual mobile payment card number) might be illegally captured from a data path to POS terminal 200 or VAN server 300 and directly from POS terminal 200 or VAN server 300.

In accordance with at least one embodiment, a virtual mobile card number is used to process a payment made using a mobile payment card of user equipment 100 instead of using the actual mobile card number. Such a method of processing a payment using a virtual mobile payment card number in accordance with at least one embodiment will be described with reference to FIG. 3. For convenience of description and ease of understanding, payment service server 400 will be described as generating twenty four virtual mobile payment card numbers for a respective mobile payment card and each assigned with a valid time period of one hour. However, the present invention is not limited thereto.

Figure 3:
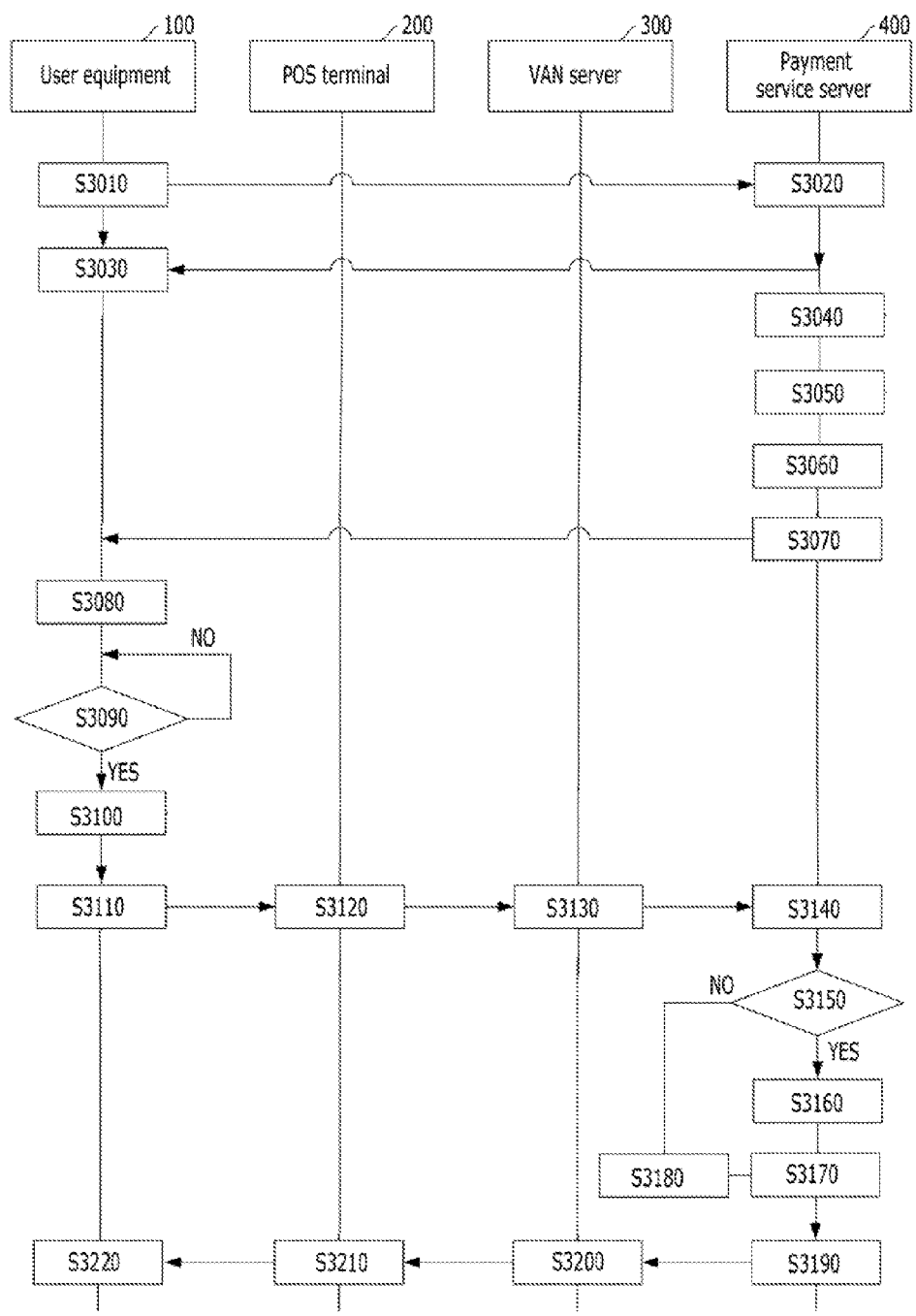
FIG. 3 illustrates a method of processing a payment made through a virtual mobile payment card number in accordance with at least one embodiment.

FIG. 3 illustrates a method of processing a payment made through a virtual mobile payment card number in accordance with at least one embodiment.

Referring to FIG. 3, user equipment 100 requests payment service server 400 to issue a mobile payment card at step S3010. For example, user equipment 100 accesses payment service server 400 and applies for an associated mobile payment card through an application installed in user equipment 100. Although the mobile payment card is described as being issued from payment service server 400, the present invention is not limited thereto. A mobile payment card may be digitally installed in user equipment 100 by registering a payment card (e.g., a typical plastic payment card) at payment service server 400 through an associated application installed in user equipment 100. Furthermore, a digital version of a typical payment card may be installed, as a mobile payment card, in user equipment 100 for a mobile payment service.

At step S3020, payment service server 400 issues a mobile payment card to user equipment 100 in response to the request. For example, payment service server 400 may perform a mobile payment card issuance procedure in response to the request from user equipment 100. Based on the result of performing the mobile payment card issuance procedure, payment service server 400 may approve the request of user equipment 100 for the issuance of the mobile payment card and provide a digital version of the mobile payment card, such as a mobile payment card application (App) to user equipment 100.

At step S3030, user equipment 100 receives the digital version of the issued mobile payment card from payment service server 400 and installs the mobile payment card therein.

At step S3040, payment service server 400 generates a predetermined number of virtual payment card numbers for the issued payment card. For example, i) Payment service server 400 generates twenty four virtual payment card numbers each assigned with a valid time period of one hour. ii) Each virtual payment card number has the same format as compared to the issued mobile payment card. iii) Each virtual payment card number has the same identifier (e.g., first six digits) as compared to the issued mobile payment card. iv) Each virtual payment card number has unique account number (e.g., next nine digits) different from that from the issued mobile payment card. v) Each virtual payment card number has unique account number (e.g., next nine digits) different from other virtual payment card number. vi) Each virtual payment card number has unique account number included in a predetermined virtual number range 100000000 to 999999999. vii) Each virtual payment card number has the last digit (e.g., 9) indicating a virtual mobile payment card number. viii) Payment service server 400 regularly generates a new set of virtual mobile payment card numbers at an interval of one day and updates and provides the new set of virtual mobile payment card numbers to user equipment 100.

At step S3050, payment service server 400 maps the set of virtual payment card number with information on the issued payment card. Table 1 shows a mapping table showing relation between the set of virtual payment card number and the issued payment card.

TABLE 1

| Issued mobile payment card | VTP | Virtual mobile payment card number |
|---|---|---|
| 123456 068090910 1 | T1 (1 AM) | 123456 100000000 9 |
| (first mobile payment card) | T2 (2 AM) | 123456 100123456 9 |
| | T3 (3 AM) | 123456 143567234 9 |
| | T4 (4 AM) | 123456 187689864 9 |
| | T5 (5 AM) | 123456 100587675 9 |
| | T6 (6 AM) | 123456 100124579 9 |
| | . | . |
| | . | . |
| | . | . |
| | T23 (11 PM) | 123456 100356899 9 |
| | T24 (12 PM) | 123456 100935536 9 |
| 123456 001005217 1 | T1 (1 AM) | 123456 100356789 9 |
| (second mobile payment card) | T2 (2 AM) | 123456 100123322 9 |
| | T3 (3 AM) | 123456 143561111 9 |
| | T4 (4 AM) | 123456 187687990 9 |
| | T5 (5 AM) | 123456 100584255 9 |
| | T6 (6 AM) | 123456 100124533 9 |
| | . | . |
| | . | . |
| | . | . |
| | T23 (11 PM) | 123456 102356899 9 |
| | T24 (12 PM) | 123456 103935536 9 |

*VTP: valid time period

At step S3060, payment service server 400 stores the mapping information between the set of virtual payment card numbers and the issued mobile payment card. At step S3070, payment service server 400 transmits the set of generated virtual payment card numbers to user equipment 100.

At step S3080, user equipment 100 receives the set of the virtual payment card numbers associated with the issued mobile payment card and stores the received set of virtual payment card numbers. Table 2 shows a mapping table of the received virtual payment card numbers associated with the issued mobile payment card, which is stored in a memory of user equipment 100.

TABLE 2

| Issued mobile payment card | VTP | Virtual mobile payment card number |
|---|---|---|
| 123456 068090910 1 (first mobile payment card) | T1 (1 AM) | 123456 100000000 9 |
| | T2 (2 AM) | 123456 100123456 9 |
| | T3 (3 AM) | 123456 143567234 9 |
| | T4 (4 AM) | 123456 187689864 9 |
| | T5 (5 AM) | 123456 100587675 9 |
| | T6 (6 AM) | 123456 100124579 9 |
| | . | . |
| | . | . |
| | . | . |
| | T23 (11 PM) | 123456 100356899 9 |
| | T24 (12 PM) | 123456 100935536 9 |

* VTP: valid time period.

At step S3090, user equipment 100 determines whether a payment process is initiated or not. Such determination may be made based on a predetermined event generated in user equipment 100. For example, such a predetermined event may be initiation of a mobile payment service application, receipt of a predetermined signal from POS terminal 200, recognition of a mobile payment card installed in user equipment 100 by POS terminal 200, or scanning of a predetermined code image displayed on user equipment 100 by POS terminal 200.

At step S3100, user equipment 100 confirms a current time as a payment initiation time and selects one of the virtual mobile card numbers based on the payment initiation time. For example, when the payment initiation time is 6:15 AM, user equipment 100 selects a virtual mobile card number corresponding to a valid time period of 6:00 AM. Accordingly, user equipment 100 selects a virtual mobile payment card number of "123456 100124579 9" from the mapping table stored in a memory of user equipment 100.

At step S3110, user equipment 100 transmits a payment request with payment card information including the selected virtual mobile payment card number (e.g., 123456 100124579 9) and the payment initiation time (e.g., 6:15 AM) to POS terminal 200. At step S3120, POS terminal 200 receives from user equipment 100 the payment request with the payment card information including the selected virtual mobile payment card number and the payment initiation time and transmits the same to VAN server 300. At step S3130, VAN server 300 receives from POS terminal 200 the payment request with the payment card information including the selected virtual mobile payment card number and the payment initiation time and transmits the same to payment service server 400.

At step S3140, payment service server 400 receives the payment request with the payment card information including the virtual payment card number and the payment initiation time.

At step S3150, payment service server 400 determines whether the received payment request is made using a virtual mobile payment card number or not. For example, payment service server 400 checks an account number or a check digit of a mobile payment card number included in the payment card information. When the account number is in the virtual card number range (e.g., 100000000 to 999999999), payment service server 400 determines that the received payment request is made using a virtual mobile payment card number. Alternatively, when the check digit is the predetermined number such as 9, payment service server 400 determines that the received payment card information is for the virtual mobile payment card number.

When payment service server 400 determines that the received payment request is made using the virtual mobile payment card number (Yes—S3150), payment service server 400 searches for an actual mobile payment card number based on a virtual mobile payment card number and a payment initiation time included in the received payment request at step S3160. Payment service server 400 may use the mapping table stored in a memory thereof, as shown in Table 1, to find the actual mobile payment card number associated with the received virtual mobile payment card. At step S3170, payment service server 400 performs a payment approval process based on the actual mobile payment card number mapped to the received virtual mobile payment card.

When payment service server 400 determines that the received payment request is made using an actual mobile payment card number (No—S3150), payment service server 400 obtains the actual mobile payment card number included in the received payment request at step S3180 and performs a payment approval process based on the obtained actual mobile payment card number at step S3170.

At step S3190, payment service server 400 transmits the result of the payment approval process to VAN server 300. At step S3200, VAN server 300 receives the payment approval result from payment service server 400 and transfers the received payment approval result to POS terminal 200. At step S3210, POS terminal 200 completes the payment process based on the received payment approval result from VAN server 300. Furthermore, POS terminal 200 transmits the payment process result to user equipment 100. At step S3220, user equipment 100 receives the payment process result from POS terminal 200 and displays the result thereon.

As described, user equipment 100 receives a set of virtual card numbers associated with an issued mobile payment card from payment service server 400, selects one of the virtual card numbers based on a payment initiation time, and transmits a payment request with the selected virtual card number to payment service server 400 through POS terminal 200 and VAN server 300 in accordance with at least one embodiment. That is, user equipment 100 makes a payment using a mobile payment card without revealing an actual mobile payment card number to third parties of a payment processing system in accordance with at least one embodiment. Hereinafter, such user equipment 100 will be described with reference to FIG. 4.

Figure 4:
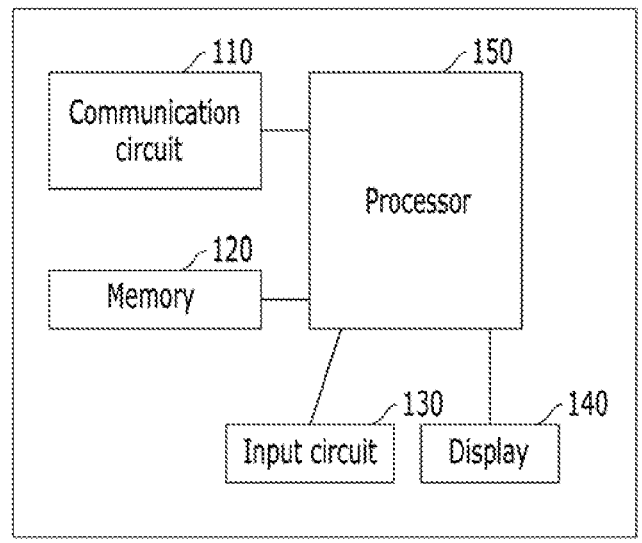
FIG. 4 illustrates user equipment for making a payment using a mobile payment card without revealing a mobile payment card number to third parties of a payment processing system in accordance with at least one embodiment.

FIG. 4 illustrates user equipment for making a payment using a mobile payment card without revealing a mobile payment card number to third parties of a payment processing system in accordance with at least one embodiment.

Referring to FIG. 4, user equipment 100 includes communication circuit 110, memory 120, input circuit 130, display 140, and processor 150.

Communication circuit 110 transmits and receives signals to/from other entities (e.g., POS terminal 200, VAN server 300, and payment service server 400) through a communication network based on various types of communication schemes. For convenience and ease of understanding, user equipment 100 is illustrated as having one communication circuit in FIG. 4, but the present invention is not limited thereto. For example, user equipment 100 may include more than two communication circuits each employing different communication scheme. Communication circuit 110 may be referred to as a transceiver and include at least one of a mobile communication circuit, a wireless internet circuit, a near field communication (NFC) circuit, a global positioning signal receiving circuit, and so forth. Particularly, communication circuit 110 may include a short distance communication circuit for short distance communication, such as NFC, and a mobile communication circuit for long range communication through a mobile communication network, such as long term evolution (LTE) communication or wireless data communication (e.g., WiFi). Through the short distance communication circuit, user equipment 100 might communicate with POS terminal 200. Through the mobile communication circuit, user equipment 100 might communicate with payment service server 400 or VAN server 300 through various types of communication networks.

In accordance with at least one embodiment, communication circuit 110 receives a mobile payment card issued from payment service server 400, such as a digital version thereof or an associated application (e.g., App) and/or various types of applications for providing a mobile payment service. Furthermore, communication circuit 110 receives a set of virtual payment card numbers associated with the issued mobile payment card from payment service server 400. In addition, communication circuit 11 transmits a payment request with one of the virtual payment card numbers, selected based on a payment initiation time, to POS terminal 200 and receives a payment process result from POS terminal 200.

Memory 120 stores various types of data including operating system for controlling user equipment 100 and at least one application necessary for providing the mobile payment service in accordance with at least one embodiment. For example, memory 220 may store an application for requesting an associated service server to issue a mobile payment card, an application for registering a plastic payment card as a mobile payment card at payment service server 400, an application for entering information on a plastic payment card as a mobile payment card, an application for a mobile payment server, and so forth. Furthermore, memory 120 stores various types of data generated during performing operations in user equipment 100.

In accordance with at least one embodiment, memory 120 stores a set of virtual payment card numbers associated with the issued mobile payment card. Such a set of virtual payment card numbers are stored in a mapping table, as shown in Table 2.

Input circuit 120 receives various types of inputs for performing operations associated with a mobile payment service. For example, input circuit 120 may receive an input that initiates an application for a mobile payment service, an input that requests the issuance of a mobile payment card to payment processing server 400, an input for making a payment of a purchase with the issued mobile payment card, and so forth. Such input circuit 120 may be a touch screen disposed on display 140.

Display 140 displays various types of data and message generated in user equipment 100. For example, display 140 displays the result of processing based on the received input through a graphic user interface. Display 140 displays various graphic user interfaces as a result of initiating various types of applications associated with the mobile payment service and displaying information generated as a result of performing the applications through the graphic user interfaces.

Processor 150 is a central processing circuitry that controls constituent elements of user equipment 100, such as communication circuit 110, memory 120, input circuit 130, and display 140 based on inputs received through input circuit 130 or based on results of performing operations associated with the mobile payment service.

In accordance with at least one embodiment, processor 150 determines a payment initiation time upon the generation of a predetermined event. Processor 150 selects one of virtual payment card numbers corresponding to the determined payment initiation time from a set of virtual payment card numbers stored in memory 120. Processor 150 transmits a payment request with payment card information including the selected virtual payment card number to POS terminal 200 through communication circuit 110.

As described, user equipment 100 receives a set of virtual mobile card numbers from payment service server 400 in accordance with at least one embodiment. Hereinafter, payment service server 400 for generating a set of virtual mobile card numbers associated with an issued mobile payment card in accordance with at least one embodiment will be described with reference to FIG. 5.

Figure 5:
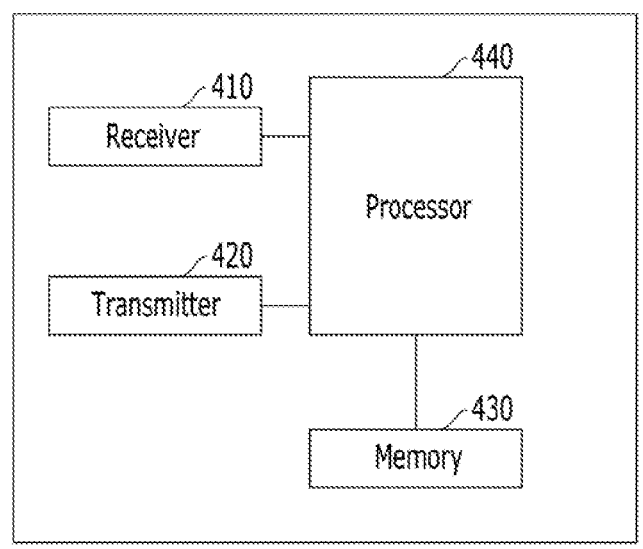
FIG. 5 illustrates a payment service server for processing a payment made using a virtual mobile card number in accordance with at least one embodiment.

FIG. 5 illustrates a payment service server for processing a payment made using a virtual mobile card number in accordance with at least one embodiment.

Referring to FIG. 5, payment service server 400 includes receiver 410, transmitter 420, memory 430, and processor 440.

Receiver 410 receives various types of signals, data, and messages from user equipment 100 through POS terminal 200 and VAN server 300. For example, receiver 410 receives a request for applications associated with a mobile payment service, a request for issuing a mobile payment card, a request for registering a payment card as a mobile payment card, and a request for processing a payment made using a virtual mobile payment card number.

Transmitter 420 transmits signals, data, and message to user equipment 100 through POS terminal 200 and VAN server 300. For example, transmitter 420 transmits applications associated with a mobile payment service in response to a request from user equipment 100, a digital version of a mobile payment card in response to the request for the issuance of a mobile payment card, a set of virtual payment card numbers associated with a respective mobile payment card, and a payment approval message as a result of processing a payment request from user equipment 100.

Memory 430 stores applications necessary for providing the mobile payment service, information on user equipment (e.g., user equipment 100) registered as a member for a mobile payment service, information on a respective mobile payment card issued to respective member user equipment, a set of virtual payment card numbers associated with a respective mobile payment card in a mapping table as shown in Table 1, and so forth. Furthermore, memory 430 stores various types of data generated during processing a payment request from user equipment 100, such as a payment approval message thereof.

Processor 440 is a central processing circuitry for performing operations for providing a mobile payment service in accordance with at least one embodiment. For example, processor 440 performs operations of issuing a mobile payment card to user equipment 100 in response to a request therefrom.

Processor 440 also performs operations of generating a set of virtual payment card numbers associated with a respective mobile payment card issued to user equipment 100 and transmitting the generated set of virtual payment card numbers. Processor 440 generates the set of virtual payment card numbers as follows. i) The predetermined number of virtual payment card numbers is generated and each is assigned with a valid time period. ii) Each virtual payment card number is generated to have the same format as compared to the issued mobile payment card and a typical payment card.

iii) Each virtual payment card number is generated to have the same issuer identifier number (e.g., first six digits) as compared to the issued mobile payment card. iv) Each virtual payment card number is generated to have an account number (e.g., next nine digits) different from an actual account number of the issued mobile payment card. v) Each virtual payment card number is generated to have unique account number (e.g., next nine digits) different from other virtual payment card numbers assigned to the same issued mobile payment card. vi) Each virtual payment card number is generated to have unique account number included in a predetermined virtual number range. vii) Each virtual payment card number is generated to have the last digit indicating a virtual mobile payment card number. viii) A new set of virtual mobile payment card numbers is regularly generated at a predetermined update cycle and updated and provided to user equipment 100

Processor 440 performs operations of determining whether a payment request is made using a virtual mobile payment card number when payment service server 400 receives a payment request from user equipment 100. Particularly, processor 440 determines whether a payment card number included in a payment request from user equipment 100 is a virtual payment card number or not. Processor 440 may determine whether the received payment card number is in a predetermined range indicating a virtual payment card. Alternatively, processor 440 determines whether a check digit of the received payment card number indicates a virtual payment card or not.

Processor 440 performs operations of searching an actual payment card number corresponding to the received virtual payment card number when the received payment card number is determined as a virtual payment card number. Processor 440 performs operations for performing a payment approval procedure based on the actual payment card number associated with the virtual payment card number. As a result of the payment approval procedure, processor 46 performs operations for transmitting a payment approval message to user equipment 100 through POS terminal 200 and VAN server 300 in accordance with at least one embodiment.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of preventing payment card information from being revealed to third parties, by a user equipment including at least one processor, at least one memory, and at least one communication circuit, the method comprising:
receiving, from a server, a message including information on a set of virtual mobile payment card numbers assigned to a mobile payment card of user equipment through a communication link established between the server and the user equipment;
selecting, by the user equipment, one of the received virtual mobile payment card numbers based on a payment initiation time upon generation of a predetermined event the selecting includes:
selecting a virtual mobile payment card number assigned a valid time period matched with the payment initiation time, where the payment initiation time is a date and time of initiating a payment; and
generating, by the user equipment payment request to include information on the selected virtual mobile payment card number with the payment initiation time; and
transmitting a payment request message with information on the selected virtual mobile payment card number and the payment initiation time to the server through at least one of a point-of-sale (POS) terminal and a value-added network (VAN) server.

2. The method of claim 1, comprising:
storing the received virtual mobile payment card numbers each assigned with a predetermined valid time period in association with information on the issued mobile payment card in a format of a mapping table.

3. The method of claim 1, comprising:
transmitting the payment request with the selected virtual mobile payment card number and the payment initiation time is transmitted to the POS terminal,
wherein the POS terminal receives from the user equipment and transmits to the VAN server the received payment request with the selected virtual mobile payment card number and the payment initiation time and the VAN server receives from the POS terminal and transmits to the server the received payment request with the selected virtual mobile payment card number and the payment initiation time.

4. The method of claim 1, wherein the receiving includes:
receiving a new set of virtual mobile payment card numbers at a regular interval from the server; and
updating a previous set of virtual mobile payment card numbers based on the new set of virtual mobile payment card numbers; and
storing the updated set of virtual mobile payment card numbers each assigned with a predetermined valid time period in association with information on the issued mobile payment card in a format of a mapping table.

5. The method of claim 1, wherein:
the set of virtual mobile payment card numbers includes a predetermined number of virtual mobile card numbers;
each virtual mobile payment card number is assigned with a predetermined valid time period;
each virtual payment card number has a numeral format identical to the issued mobile payment card;
each virtual payment card number has an issuer identifier identical the issued mobile payment card;
each virtual payment card number has an account number different from an actual account number of the issued mobile payment card; and
each virtual payment card number has a unique account number different from other virtual payment card numbers assigned to the same issued mobile payment card.

6. The method of claim 1, wherein:
each virtual payment card number has an unique account number included in a predetermined virtual number range; and
each virtual payment card number has a check digit indicating a virtual mobile payment card number.

7. The method of claim 1, wherein:
each virtual mobile payment card number has a sequence of sixteen numeral digits;
each virtual mobile payment card number includes a first six of the numeral digits indicating an issuer identifier and identical to the issued mobile payment card; and
each virtual mobile payment card number has a next nine of the numeral digits indicating an account number and included in a predetermined virtual payment card number range.

8. User equipment for preventing payment card information from being revealed to third parties, by a user equipment including at least one processor, at least one memory, and at least one communication circuit, the user equipment comprising:
at least one communication circuit configured to establish a link to at least one of a server, a point-of-sale (POS) terminal, and a value-added network (VAN) server, to transmit digital messages to the at least one of the server, the POS terminal, and the VAN server, and to receive information from the at least one of the server, the POS terminal, and the VAN server through the established link;
at least one memory configured to store information associated with preventing payment card information from being revealed to third parties; and
at least one processor configured to control the at least one communication circuit and the at least one memory and to perform operations based on the digital messages transmitted and received through the at least one communication circuit and based on the information stored in the at least one memory,
wherein the at least one processor is configured to:
receive, from the server, a message including information on a set of virtual mobile payment card numbers assigned to a mobile payment card issued to the user equipment;
select, by the user equipment, one of the received virtual mobile payment card numbers based on a payment initiation time upon generation of a predetermined event the selecting includes:
selecting a virtual mobile payment card number assigned a valid time period matched with the payment initiation time, where the payment initiation time is a date and time of initiating a payment; and generating, by the user equipment payment request to include information on the selected virtual mobile payment card number with the payment initiation time; and transmit a payment request message with the selected virtual mobile payment card number and the payment initiation time to the server through at least one of the point-of-sale (POS) terminal and the value-added network (VAN) server.

9. The user equipment of claim 8, wherein the at least one processor is configured to:

receive a new set of virtual mobile payment card numbers at a regular interval from the server;

update a previous set of virtual mobile payment card numbers with the new set of virtual mobile payment card numbers; and store the updated set of virtual mobile payment card numbers each assigned with a predetermined valid time period in association with information on the issued mobile payment card in a format of a mapping table.

10. The user equipment of claim 8, wherein the server is configured to:

generate a predetermined number of virtual mobile card numbers as the set of virtual mobile payment card numbers assigned to the issued mobile payment card;

generate each virtual mobile payment card number to be assigned with a predetermined valid time period;

generate each virtual payment card number to have a numeral format identical to the issued mobile payment card;

generate each virtual payment card number to have an issuer identifier identical the issued mobile payment card;

generate each virtual payment card number to have an account number different from an actual account number of the issued mobile payment card;

generate each virtual payment card number to have an unique account number different from other virtual payment card numbers assigned to the same issued mobile payment card;

generate each virtual payment card number to have an unique account number included in a predetermined virtual number range; and generate each virtual payment card number to have a check digit indicating a virtual mobile payment card number.

* * * * *